United States Patent
Hussey

(10) Patent No.: US 7,861,218 B2
(45) Date of Patent: Dec. 28, 2010

(54) COMPUTER METHOD AND SYSTEM FOR ENFORCING DERIVED UNION CONSTRAINTS

(75) Inventor: Kenneth Earle Hussey, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 10/975,780

(22) Filed: Oct. 28, 2004

(65) Prior Publication Data

US 2006/0101380 A1    May 11, 2006

(51) Int. Cl.
G06F 9/44    (2006.01)

(52) U.S. Cl. .................. 717/108; 717/116; 717/118; 717/121

(58) Field of Classification Search .......... 717/104–118
See application file for complete search history.

(56) References Cited

U.S. PATENT DOCUMENTS

| | | | |
|---|---|---|---|
| 5,987,247 | A | 11/1999 | Lau |
| 6,337,696 | B1 | 1/2002 | Lindhorst et al. |
| 6,356,955 | B1 | 3/2002 | Hollberg et al. |
| 6,611,955 | B1 * | 8/2003 | Logean et al. ............... 717/128 |
| 7,039,908 | B2 * | 5/2006 | Steensgaard ................ 717/151 |
| 7,069,537 | B2 | 6/2006 | Lazarov |
| 7,219,328 | B2 | 5/2007 | Schloegel et al. |
| 7,293,254 | B2 | 11/2007 | Bloesch |
| 7,404,176 | B2 | 7/2008 | Reeder et al. |
| 2002/0104068 | A1 | 8/2002 | Barrett et al. |
| 2002/0133812 | A1 * | 9/2002 | Little et al. .................. 717/140 |
| 2002/0147763 | A1 * | 10/2002 | Lee et al. ..................... 709/202 |
| 2004/0015843 | A1 | 1/2004 | Quan, Jr. |
| 2004/0139095 | A1 * | 7/2004 | Trastour et al. ............. 707/100 |
| 2005/0071805 | A1 | 3/2005 | Lauterbach et al. |
| 2005/0076328 | A1 * | 4/2005 | Berenbach et al. .......... 717/104 |
| 2005/0160401 | A1 | 7/2005 | Russo |
| 2005/0188353 | A1 * | 8/2005 | Hasson et al. ............... 717/116 |
| 2005/0261923 | A1 | 11/2005 | Brown et al. |
| 2005/0268281 | A1 * | 12/2005 | Letkeman et al. ........... 717/120 |
| 2006/0064667 | A1 * | 3/2006 | Freitas ........................ 717/104 |
| 2006/0101376 | A1 * | 5/2006 | Gutz et al. ................... 717/104 |

FOREIGN PATENT DOCUMENTS

JP    2001075817    3/2001

OTHER PUBLICATIONS

Unified Modeling Language: Infrastructure version 2.0, 3rd revised submission to OMG RFP ad/00-09-01, Jan. 6, 2003, Version 2.0, pp. 1-173.*

(Continued)

*Primary Examiner*—Tuan Q Dam
*Assistant Examiner*—Issac T Tecklu
(74) *Attorney, Agent, or Firm*—Hamilton, Brook, Smith & Reynolds, P.C.

(57) ABSTRACT

A computer method and system preserves derived union constraints and enforces the same in generated target code. The method includes (a) providing a model element having one or more derived union properties, (b) tracking derived union constraints from the derived union properties of the model element, and (c) interpreting the tracked derived union constraints and generating therefrom an implemenation that enforces the derived union constraint. Tracking may be by annotating the model element accordingly.

14 Claims, 7 Drawing Sheets

OTHER PUBLICATIONS

Budinsky, F. et al., "Dynamic EMF," *Eclipse Modeling Framework—A Developer's Guide*, Addison-Wesley (2004), table of contents.

Merks, E., "The Eclipse Modeling Framework: Introducing Modeling to the Java™ Technology Mainstream," *JavaOne Sun's 2004 Worldwide Java Developer Conference*, slides 1-37 (2004).

OMG Document, "UML 2.0 Infrastructure Specification," Sep. 2003, Object Management Group, Inc., pp. 1-187.

"Unified Modeling Language: Superstructure," Version 2.0, Final Adopted Specification, pp. 569-584 (2003).

Szostak, S. et al., "UML Extensions for Modeling Real-Time and Embedded Systems," *The International Workshop on Discrete-Event System Design*, DESDcs '01, Przytok, Poland, pp. 1-6 (Jun. 27-29, 2001).

D'Souza, D. et al., "First Class Extensibility for UML—Packaging of Profiles, Stereotypes, Patterns," In UML '99—*The Unified Modeling Language—Beyond the Standard*, Second International Conference, Fort Collins, Colorado, pp. 265-277 (Oct. 28-30, 1999).

Selonen, P. and Xu, J., "Validating UML Models Against Architectural Profiles," *Proceedings of 9th European Software Engineering Conference/11th ACM SIGSOFT International Symposium on Foundations of Software Engineering '03*, Helsinki (ACM SIGSOFT Software Engineering Notes) 28(5): 58-67 (Sep. 1-5, 2003).

Cortellessa, V. and Pompei, A., "Towards a UML profile for QoS: a contribution in the reliability domain," *Proceedings of the Fourth International Workshop on Software and Performance*, Redwood Shores, California (ACM SIGSOFT Software Engineering Notes) 29(1): 197-206 (Jan. 14-16, 2004).

Alhir, Sinan Si, "Extending the Unified Modeling Language (UML)," retrieved from: http://citeseer.ist.psu.edu/alhir99extending.html (Jan. 3, 1999).

Gogolla, Martin, et al., "Analysis of UML Stereotypes within the UML Metamodel," *UML 2002, LNCS 2460*, pp. 84-99 (2002).

Budinsky, et al., "Eclipse Modeling Framework: A Developer's Guide," sections 5.7, 13.6; *Addison Wesley Professional* (Aug. 11, 2003).

Budinsky, et al., "Eclipse Modeling Framework: A Developer's Guide," sections 5.5, 8.2: *Addison Wesley Professional* (Aug. 11, 2003).

Budinsky, F., et al., "Dynamic EMF," Eclipse Modeling Framework—A Developer's Guide, Addison-Welsey, pp. v-xiv, 34-35 (2004).

Buttner, Fabian and Gogolla, Martin, "On Generalization and Overriding in UML 2.0," Oct. 12, 2004, "OCL and Model Driven Engineering," UML 2004 Conference Workshop, pp. 1-15.

Akehurst, D., et al., "Implementing Associations: UML 2.0 to Java 5," Mar. 2007, *Software and Systems Modeling*, 6(1). pp. 3-35.

OMG Document, "Unified Modeling Language: Superstructure," Aug. 2003, Object Management Group, Inc., Version 2.0, pp. 1-609.

\* cited by examiner

COMPUTER METHOD AND SYSTEM FOR ENFORCING DERIVED UNION CONSTRAINTS

BACKGROUND OF THE INVENTION

With the proliferation of software products and services, attempts have been made to codify and/or standardize the designing of software and software architecture.

Examples include:

The Booch Method and Modeling Language (see "Object Oriented Analysis and Design" by Grady Booch);

James Rumbaugh and associates' Object Modeling Technique (OMT);

the Object Oriented Software Engineering (OOSE) method by Ivar Jacobson; and the Unified Modeling Language (UML) which combines the foregoing and industry best practices.

The UML is a visual modeling language (with formal syntax and semantics) for communicating a model or conceptionalization. Thus the modeling language specification specifies modeling elements, notation and usage guidelines and not order of activities, specification of artifacts, repository interface, storage, run-time behavior and so forth. In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

A property in UML 2.0 can be marked as being a derived union. The collection of values denoted by the property in some context is derived as the strict union (superset) of all the values denoted, in that context, by properties that subset it. A derived property is identified as a union with a union constraint on the supersetting property.

The Rose model for UML 2.0 contains many attributes and associations that are constrained to be derived unions. There are, however, no known mechanisms for generating Java code that enforces these constraints. The Eclipse Modeling Framework (EMF) can be used to generate Java code from a Rose model, but provides no automated support for processing derived unions. Indeed, since all such properties are derived, the EMF discards these properties altogether. Even if these properties were retained, the constraint information is discarded by EMF during code generation.

SUMMARY OF THE INVENTION

The present invention overcomes the above limitation and provides a mechanism for generating target code (e.g. Java) that enforces derived union constraints.

In one embodiment, a computer method for enforcing derived union constraints includes the steps of:

providing a model element having one or more derived union properties;

tracking derived union constraints from the one or more derived union properties of the model element; and interpreting the tracked derived union constraints and generating therefrom an implementation that enforces the derived union constraint.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Since it would be desirable to generate code that in some way reflects derived union constraints, the present invention records information about derived union properties as constraints. The present invention records this information in the form of annotations on a code generation model. Such properties are made non-changeable, transient, volatile, and non-containment, and corresponding overriding operations are created on classes that contain subsetting properties for the derived unions. Java templates are used to automatically generate code for these operations based on the annotations. The generated comments for the methods associated with these operations indicate for which properties the operation represents a superset, and code is generated for the bodies of these methods, as described below.

There are a couple of scenarios to consider with respect to derived unions. First, consider the case of a non-list derived union. Shown in FIG. 1 is an example.

There is shown a class called "NamedElement" 15 with two properties—"name" and "/qualifiedName". The latter (/qualifiedName) has a derived value which is computed on demand (in real time), as indicated by the forward slash prefix.

A Namespace object 13 is a type of NamedElement 15 (i.e., is an instance of the class 15). The relationship or associations between Namespace 13 and NamedElement 15 model elements (objects) are indicated at 17 and include certain properties 19a,b of Namespace 13. Each of these properties 19 is a derived union of a respective set of values indicated between curly brackets. The constraint label (or flag) 'union' is also indicated in the curly brackets.

Figure 1:
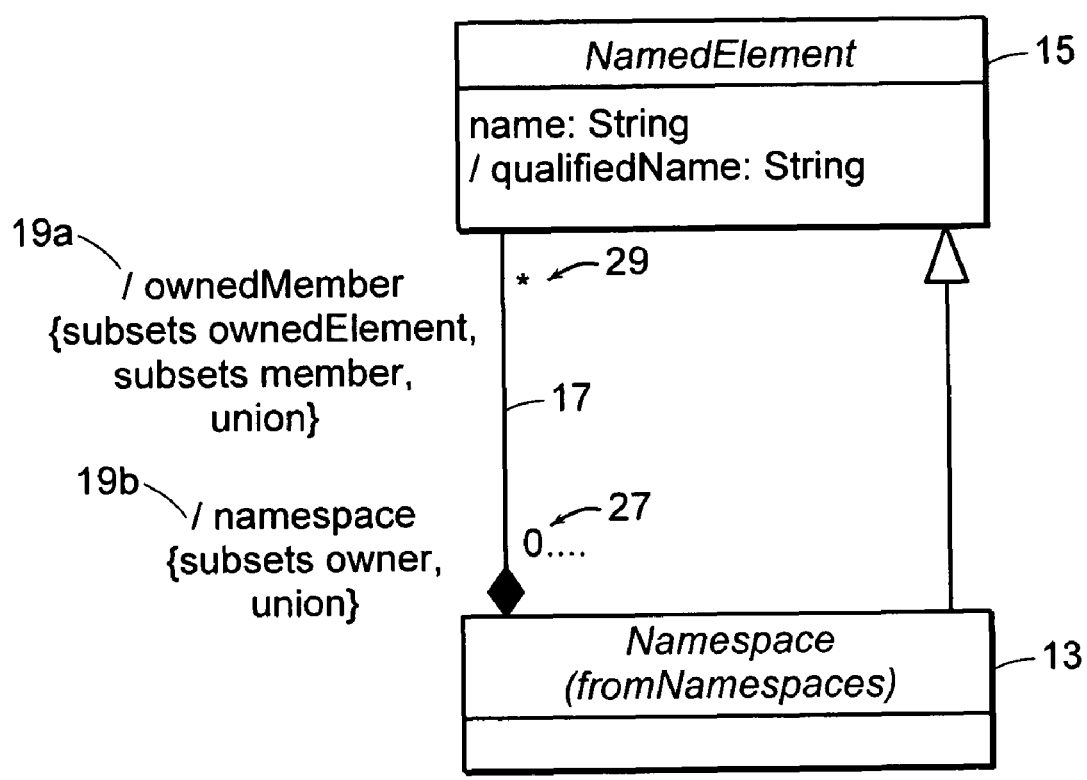
FIG. 1 is a schematic illustration of a non-list derived union property "namespace".

The "0.1" in FIG. 1 indicates a multiplicity 27 on the relationship 17. So the indicated number (multiplicity 27) of the Namespace objects 13 can be related to a given NamedElement object 15.

Similarly cardinality 29 of the relationship 17 is represented by an asterisk and has a value indicating the number of NamedElement objects 15 related to a given Namespace 13 instance.

The derived unions (i.e., sets of values) and valid values for multiplicity 27 (and cardinality 29) of a relationship 17 are constraints on that relationship (association between objects 13, 15). Further, if Namespace object 13 is related to other instances/objects, then these other instances/objects inherit these constraints.

Figure 2:
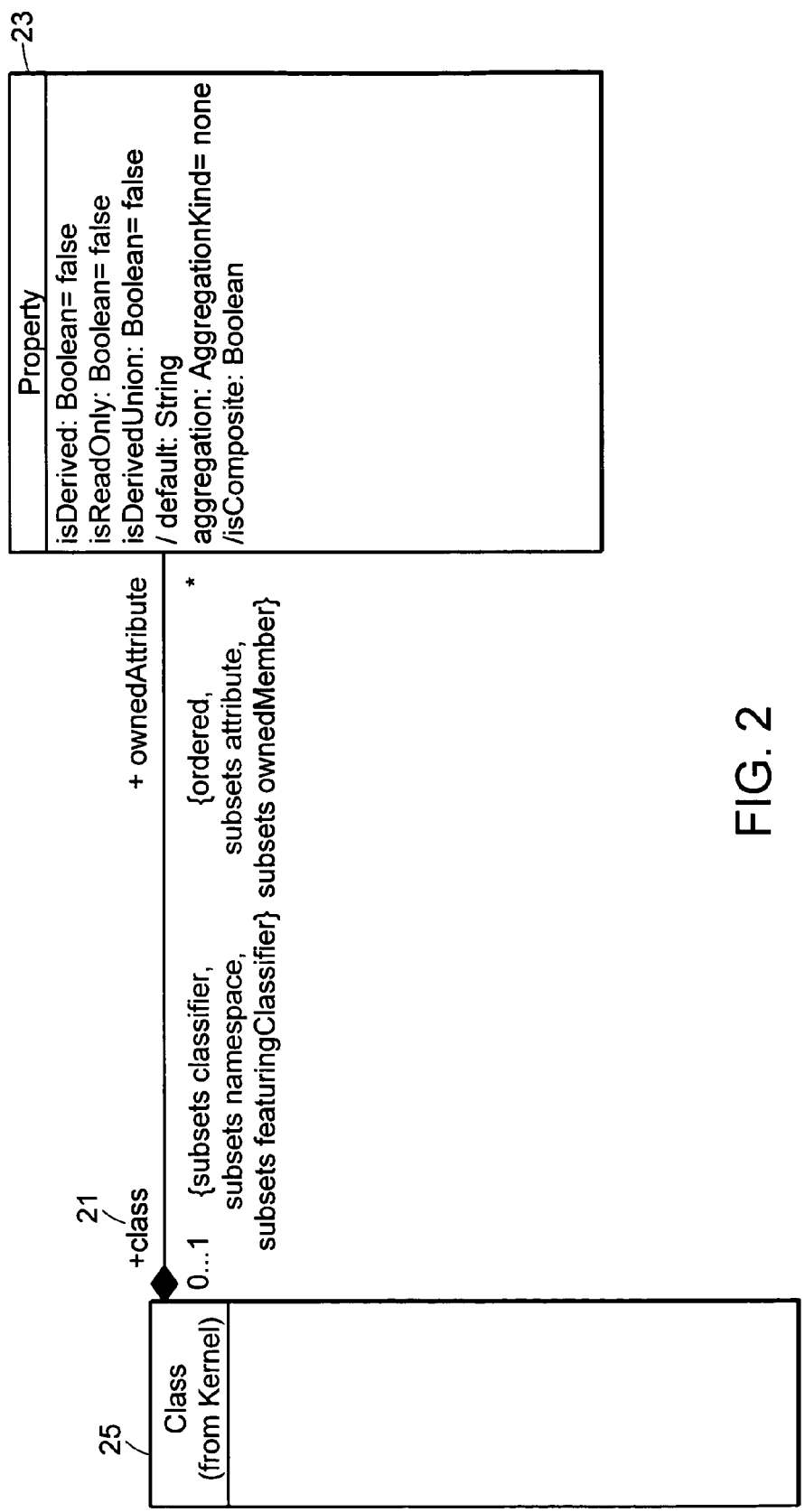
FIG. 2 is a schematic illustration of the derived union of FIG. 1 subsetted by the "class" property.

In FIG. 2, property "namespace" 19b of FIG. 1 is subsetted by the "class" property 21 in the relationship between Property object 23 and Class object 25. In this context, a subset of the values of namespace 19b (defined in FIG. 1 as a derived union) is used as the values of class property 21.

Figure 5:
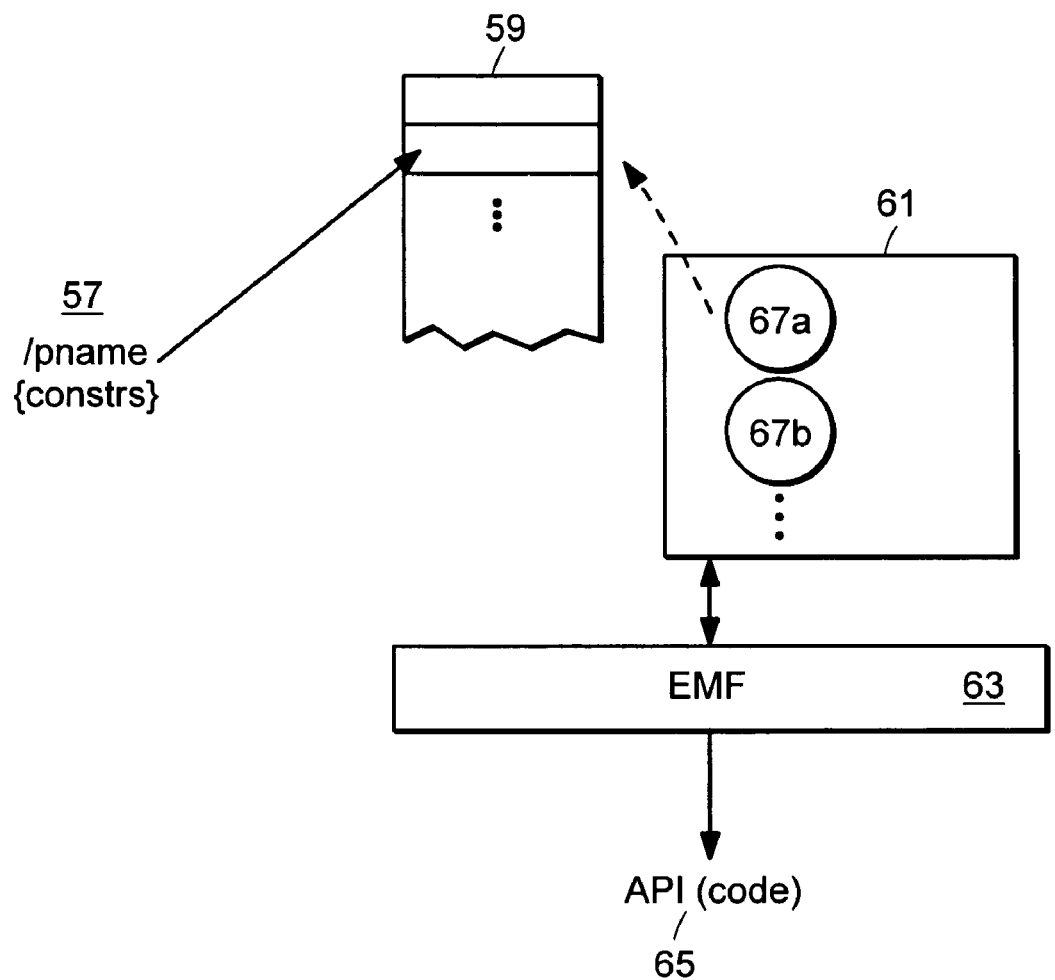
FIG. 5 is a block diagram of a preferred embodiment.

In the present invention, contents of the curly brackets (i.e., the derived union constraints) are traversed and maintained as annotations on a subject model element instead of being parsed out as in the prior art. As illustrated in FIG. 5, in the preferred embodiment, a subject Rose model is used and is the basis for a code generation model 61 of interest, i.e., the software product model being designed. The Rose model for 61 provides support for initially capturing the constraints denoted in curly brackets. The present invention records in the form of annotations 59 in respective parts of the code generation model 61 constraint information for each derived union property (generally 57) of respective model elements 67. Next the present invention employs EMF to generate JAVA code (or the like) from the annotated code generation model 61, 59 in a manner that supports processing derived unions. In particular, the invention EMF processing 63 interprets derived union constraint information and keeps track of derived union (originally curly bracketed) items using the annotation entries 59. The resulting EMF 63 output is an API (e.g., in an object oriented programming language) 65 that enforces derived union constraints.

In the case of subsetted properties, corresponding overriding operations are created on classes that contain subsetting properties for the derived unions. Java templates are used to automatically generate code for these operations based on the annotations 59. The generated comments for the methods associated with these operations indicate for which properties the operation represents a superset, and code is generated for the bodies of these methods.

For purposes of illustration and not limitation, the present invention generates code for the getNamespace( ) operation on the PropertyImpl class (created to override the implementation inherited from its parent) that resembles the following:

```
if (null != getClass_( ) ) {
    return (Namespace) getClass_( );
}
if (null != getOwningAssociation( ) ) {
    return (Namespace) getOwningAssociation( );
}
if (null != getDatatype( ) ) {
    return (Namespace) getDatatype( );
}
return super.getNamespace( );
```

Figure 3:
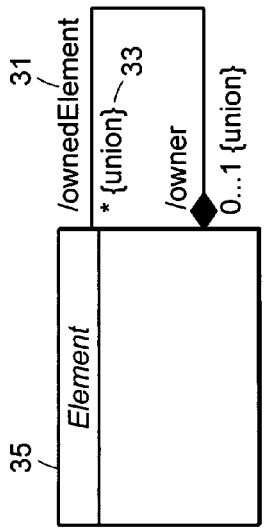
FIG. 3 is a schematic illustration of a list derived union property "ownedElement".
Figure 4:
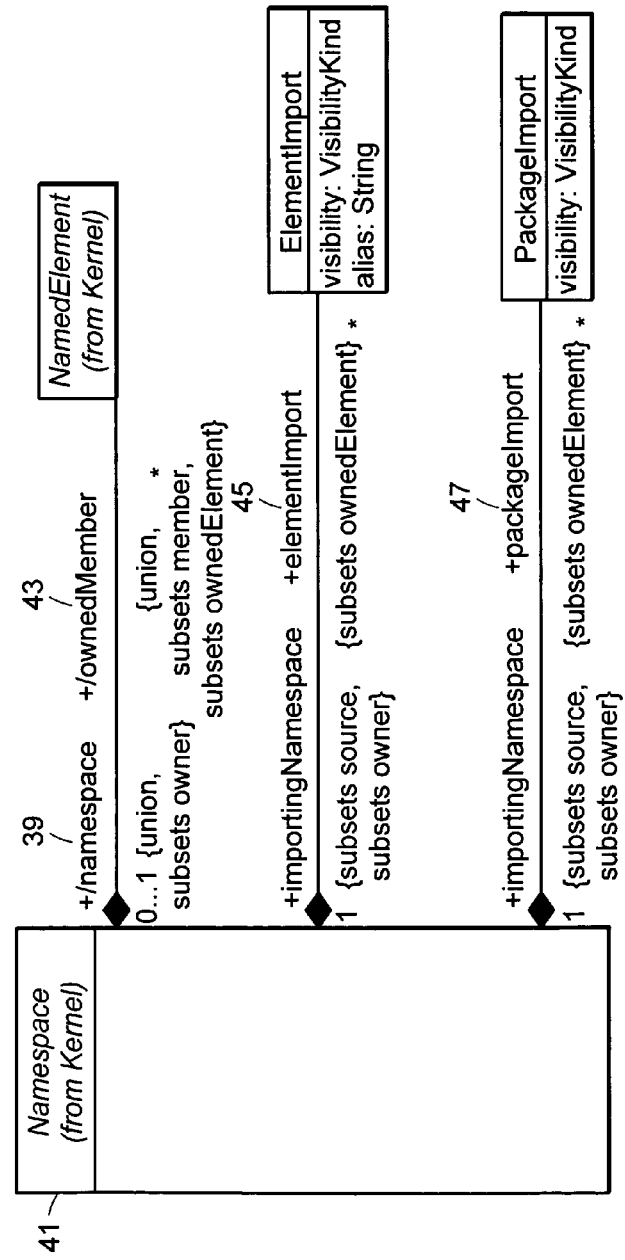
FIG. 4 is a schematic illustration of the derived union of FIG. 3 subsetted by the properties "ownedMember", "elementImport" and "packageImport".

Now consider the case of a list derived union. For example, the ownedElement property 31 of the Element class 35 is a derived union, as shown in FIG. 3. That is, the property 31 name is preceded with a slash ("/"), and indicated between curly brackets is the 'union' constraint 33. Further, the "ownedElement" 31 derived union is subsetted by, for example, the ownedMember (also a derived union), elementImport, and packageImport properties 43, 45, 47 of the Namespace class 41, shown in the class diagram of FIG. 4. Thus objects of the Namespace class 41 inherit from the properties "namespace" 39 (also a derived union) and "ownedMember" 43, the respective derived union and subsets constraints. The "ownedElement" 31 part of these constraints includes its own derived union constraint 33 as discussed in FIG. 3 above and as used here is a nested derived union 33.

Similarly, property elementImport 45 and property packageImport 47 each has a nested derived union constraint due to subsetted ownedElement 31.

The present invention thus not only maintains annotations 59 (FIG. 5) of the contents between curly brackets for derived unions 57 but also includes any nested derived union data. Such a superset (multiple level inclusive) list of annotations 59 represents the derived union constraints of interest. The preferred embodiment employs EMF 63 to interpret these derived union constraints (including nested ones) from recorded annotation entries 59 and generate a corresponding API 65 that enforces them. An example code generation follows.

The preferred embodiment generates code for the getOwnedElement( ) operation on the NamespaceImpl class (created to override the implementation inherited from its parent) that resembles the following:

```
Set union=new HashSet( );
union.addAll(super.getOwnedElement( ));
union.addAll(getOwnedMember( ));
union.addAll(getElementImport( ));
union.addAll(getPackageImport( ));
return new EcoreEList.UnmodifiableEList(this, Uml2Package.eINSTANCE.getElement_OwnedElement(    ), union.size( ), union.toArray( ));
```

Figure 6:
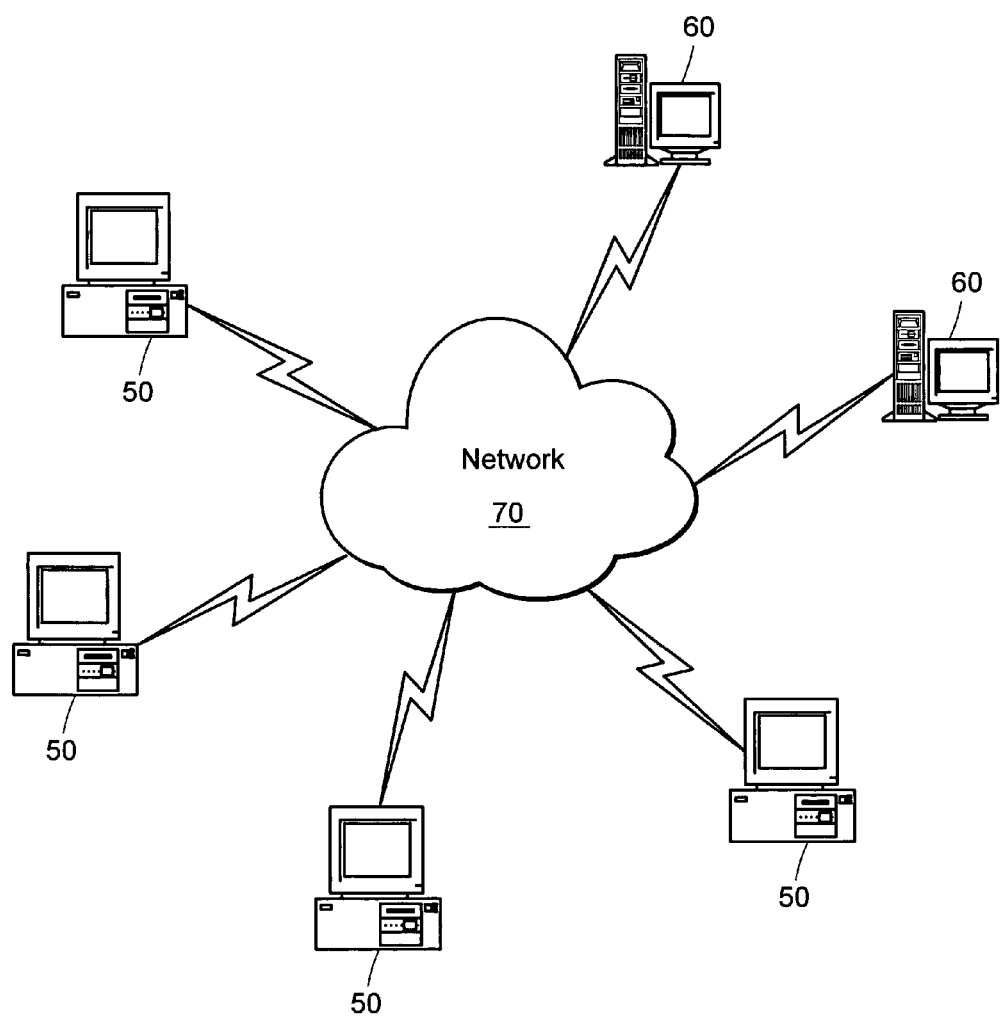
FIG. 6 is a schematic view of a computer environment in which the principles of the present invention may be implemented.

FIG. 6 illustrates an example computer environment in which the present invention operates. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the methods are implemented on a standalone computer. In either network or standalone, the invention output software design and models (API's) are sharable and reusable among users.

Figure 7:
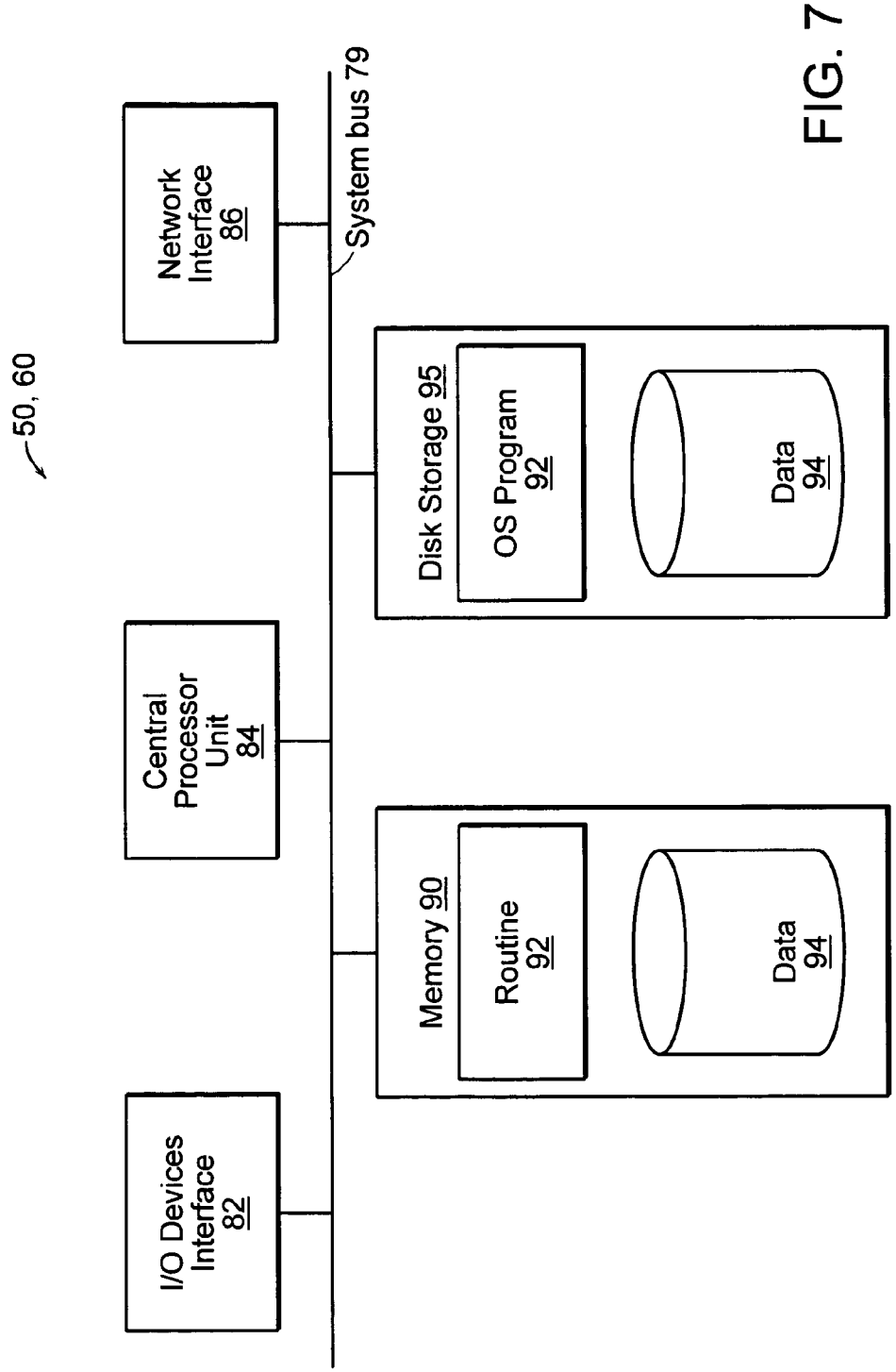
FIG. 7 is a block diagram of the internal structure of a computer from the FIG. 6 computer environment.

FIG. 7 is a diagram of the internal structure of a computer (e.g., client computer(s) 50 or server computers 60) in the computer system of FIG. 6. Each computer contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 6). Memory 90 provides volatile storage for computer software instructions used to implement an embodiment of the present invention (e.g., EMF code and Rose models of subject Program Routines 92 and Data 94). Disk storage 95 provides non-volatile storage for computer software instructions and data used to implement an embodiment of the present invention. Central processor unit 84 is also attached to system bus 79 and provides for the execution of computer instructions.

Figure 8:
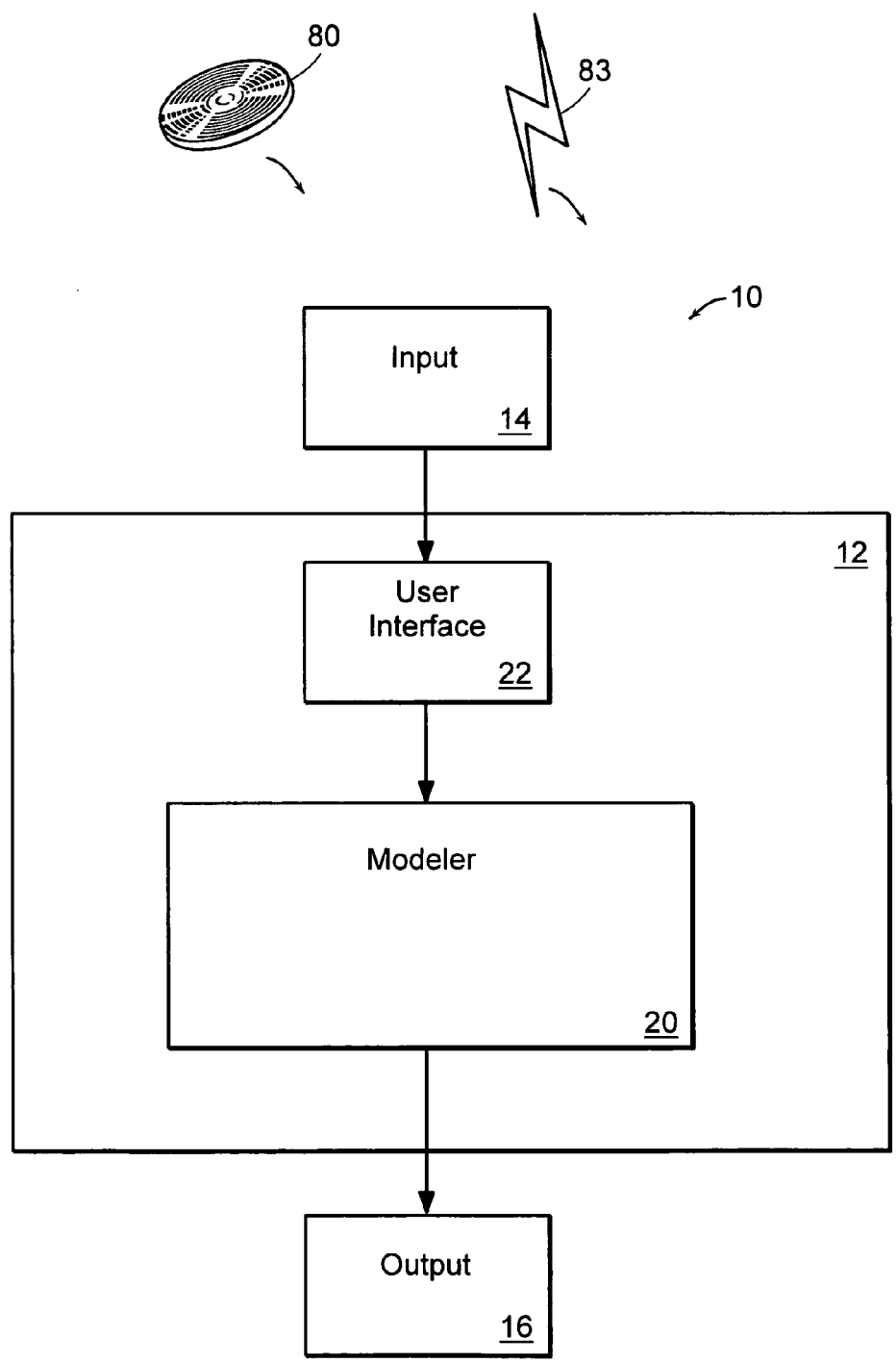
FIG. 8 is a schematic illustration of computer systems implementing methods of the present invention.

Referring now to FIG. 8 illustrated is another computer system 10 embodying the present invention techniques mentioned above. Generally, computer system 10 includes digital processor 12 in which subject modeling language and EMF code 20 are utilized. Input means 14 provides user commands, selections (generally communication) to computer system 10.

Responsive to input means 14 is user interface 22. User interface 22 receives user input data from input means 14 and provides input data for processing and manipulation at 20. The methods of the invention are implemented at 20 for designing Application Program Interfaces that enforce derived union constraints in JAVA, UML, EMF and the like which are output at 16. Output 16 may be a display monitor, printer or other computer.

In one embodiment, computer program product 80, including a computer readable medium (e.g., a removable storage medium such as one or more DVD-ROM's, CD-ROM's, diskettes, tapes, etc.) provides at least a portion of the software instructions at 20 and/or user interface 22. Computer program product 80 can be installed by any suitable software installation procedure, as is well known in the art. In another embodiment, at least a portion of the software instructions may also be downloaded over a wireless connection. Computer program propagated signal product 83 embodied on a propagated signal on a propagation medium (e.g., a radio wave, an infrared wave, a laser wave, a sound wave, or an electrical wave propagated over a global network such as the Internet, or other network(s)) provides at least a portion of the software instructions at 20 and/or user interface 22.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 80 is a propagation medium that the computer system 10 may receive and read, such as by receiving the propagation medium and identifying a propagated signal embodied in the propagation medium, as described above for computer program propagated signal product 83.

Generally speaking, the term "carrier medium" or transient carrier encompasses the foregoing transient signals, propagated signals/medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the model interpreter 63 may be implemented in UML, EMF and other modeling languages. The resulting API code (generated implementation) 65 may be in Java, UML, EMF, XML and the like.

What is claimed is:

1. In a programming model using a modeling language, a Computer method for enforcing derived union constraints comprising:

given the modeling language is of the Unified Modeling Language (UML) type, using the modeling language, defining metaclasses and having model elements as instances of metaclasses, model elements including properties having respective values, and UML-derived-union-constraints being distinct from stereotypes and being constraints on model elements defined by a superset of values of a respective property;

providing a model element having one or more derived union properties, each derived union property having a superset of values denoted by the property;

tracking UML-derived-union-constraints from the one or more derived union properties of the model element, including keeping track of derived union items of the model element;

interpreting the tracked UML-derived-union-constraints and generating therefrom an Application Program Interface code implementation that enforces the UML-derived-union-constraint, including generating code implementing overriding operations on classes that contain subsetting properties for the one or more derived union properties of the model element, wherein the tracking provides to the interpreting indications of which properties the operations represent a superset; and outputting the generated Application Program Interface code to a user.

2. A method as claimed in claim 1 wherein the step of interpreting and generating employs EMF (Eclipse Modeling Framework).

3. A method as claimed in claim 1 wherein the step of generating generates target programming language code that enforces the UML-derived-union-constraints.

4. A method as claimed in claim 1 wherein the step of tracking includes recording derived union constraint information as an annotation to the model element.

5. A method as claimed in claim 1 wherein the step of tracking includes accounting for nested UML-derived-union-constraints.

6. A computer program product implementing modeling of derived union constraints, the computer program product comprising:

a computer readable physical storage medium having computer readable code embodied therewith and controlling a processor to implement modeling of Unified Modeling Language (UML) derived union constraints, by carrying out the steps of:

providing a model element having one or more derived union properties;

tracking UML-derived-union-constraints from the one or more derived union properties of the model element, including keeping track of derived union items of the model element; and interpreting the tracked UML-derived-union-constraints and generating therefrom a code implementation that enforces the UML-derived-union-constraints, including generating code implementing overriding operations on classes that contain subletting properties for the one or more derived union properties of the model element, wherein the tracking provides to the interpreting indications of which properties the operations represent a surperset.

7. A computer program product as claimed in claim 6 wherein the step of interpreting and generating employs EMF (Eclipse Modeling Framework).

8. A computer program product as claimed in claim 7 wherein the step of generating generates JAVA code that enforces the UML-derived-union-constraints.

9. A computer program product as claimed in claim 7 wherein the step of tracking includes recording derived union constraint information as an annotation to the model element.

10. A computer program product as claimed in claim 7 wherein the step of tracking includes accounting for nested UML-derived-union-constraints.

11. A computer readable storage medium comprising computer readable code controlling a processor in a manner implementing_derived union constraints in a target code, by carrying out the steps of:

provicing a model element having one or more derived union properties;

recording UML-derived-union-constraints from the one or more derived union properties, including keeping track of derived union items of the model element;

and interpreting the recorded UML-derived-union-constraints and generating target code therefrom that implements the derived union constraint, including generating code implementing overriding operations on classes that contain subsetting properties for the one or more derived union properties of the model element, wherein the tracking provides to the interpreting indications of which properties the operations represent a surperset.

12. A computer readable storage medium as claimed in claim 11 wherein the step of interpreting and generating employs EMF (Eclipse Modeling Framework).

13. A computer readable storage medium as claimed in claim 11 wherein the target code is JAVA.

14. A computer readable storage medium as claimed in claim 11 wherein the step of recording includes recording derived union constraint information as an annotation to the model element.

* * * * *